(12) United States Patent
Fujisawa (10) Patent No.: US 10,581,725 B2
(45) Date of Patent: Mar. 3, 2020

(54) INFORMATION PROCESSING APPARATUS HAVING A MULTI-CONNECTION COMMUNICATION FUNCTION FOR TRANSMITTING AND RECEIVING DATA BLOCKS BY USING A PLURALITY OF CONNECTIONS, METHOD FOR CONTROLLING THE SAME, AND STORAGE MEDIUM

(71) Applicant: CANON KABUSHIKI KAISHA, Tokyo (JP)

(72) Inventor: Minoru Fujisawa, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 553 days.

(21) Appl. No.: 14/875,941

(22) Filed: Oct. 6, 2015

(65) Prior Publication Data
US 2016/0099833 A1    Apr. 7, 2016

(30) Foreign Application Priority Data

Oct. 7, 2014  (JP) .................................. 2014-206739

(51) Int. Cl.
| | |
|---|---|
| *H04L 12/24* | (2006.01) |
| *H04L 12/721* | (2013.01) |
| *H04L 29/08* | (2006.01) |
| *H04L 29/06* | (2006.01) |

(52) U.S. Cl.
CPC .............. *H04L 45/26* (2013.01); *H04L 67/02* (2013.01); *H04L 69/14* (2013.01); *H04L 67/12* (2013.01); *H04L 69/24* (2013.01)

(58) Field of Classification Search
CPC ......... H04L 45/26; H04L 69/14; H04L 67/02; H04L 69/24; H04L 67/12
See application file for complete search history.

(56) References Cited

U.S. PATENT DOCUMENTS

| | | | | |
|---|---|---|---|---|
| 5,774,654 | A | * | 6/1998 | Maki .................. H04N 1/32797 340/2.71 |
| 8,806,030 | B2 | * | 8/2014 | Zhu ....................... H04L 67/141 709/228 |
| 2005/0240622 | A1 | * | 10/2005 | Cheung ............. G06F 17/30286 |
| 2008/0085699 | A1 | * | 4/2008 | Hirano ................ H04W 64/003 455/414.2 |
| 2008/0231466 | A1 | * | 9/2008 | Mazrooee ........... H04L 12/4625 340/853.1 |

(Continued)

FOREIGN PATENT DOCUMENTS

| | | |
|---|---|---|
| JP | 2007318694 A | 12/2007 |
| JP | 2010504688 A | 2/2010 |

(Continued)

*Primary Examiner* — Philip J Chea
*Assistant Examiner* — Wuji Chen
(74) *Attorney, Agent, or Firm* — Canon U.S.A., Inc. IP Division (57) ABSTRACT

An information processing apparatus which has received an instruction to perform communication determines whether a server supports multi-connection communication. When the information processing apparatus determines that the server does not support multi-connection communication, the information processing apparatus performs communication by using one connection instead of using multi-connection communication.

17 Claims, 10 Drawing Sheets

(56) References Cited

U.S. PATENT DOCUMENTS

| | | | | |
|---|---|---|---|---|
| 2009/0216888 | A1* | 8/2009 | Furukawa | H04L 67/06 709/228 |
| 2010/0318685 | A1* | 12/2010 | Kraus | G07C 9/00944 709/249 |
| 2011/0185011 | A1* | 7/2011 | Shuman | H04W 8/24 709/203 |
| 2012/0110194 | A1* | 5/2012 | Kikkawa | H04L 69/14 709/227 |
| 2012/0144019 | A1* | 6/2012 | Zhu | H04L 67/141 709/224 |
| 2013/0041997 | A1* | 2/2013 | Li | H04W 4/005 709/223 |
| 2013/0057388 | A1* | 3/2013 | Attanasio | G06Q 50/26 340/10.1 |
| 2013/0151708 | A1* | 6/2013 | Shelby | H04L 65/40 709/226 |
| 2013/0179926 | A1* | 7/2013 | White | H04L 12/2809 725/59 |
| 2013/0290305 | A1* | 10/2013 | Feng | H04W 4/70 707/722 |
| 2013/0339375 | A1* | 12/2013 | Adayikkoth | G06F 17/30144 707/754 |
| 2014/0359552 | A1* | 12/2014 | Misra | H04L 67/12 717/100 |
| 2015/0188969 | A1* | 7/2015 | Boshev | H04L 65/602 709/203 |

FOREIGN PATENT DOCUMENTS

| | | |
|---|---|---|
| JP | 2012-95098 A | 5/2012 |
| JP | 2012155619 A | 8/2012 |

* cited by examiner

| SERVER | MULTI-CONNECTION COMMUNICATION (DATA TRANSMISSION) | MULTI-CONNECTION COMMUNICATION (DATA ACQUISITION) |
|---|---|---|
| http://aaa.com | SUPPORTED | SUPPORTED |
| http://bbb.co.jp | NOT SUPPORTED | NOT SUPPORTED |
| http://ccc.com | SUPPORTED | NOT SUPPORTED |

INFORMATION PROCESSING APPARATUS HAVING A MULTI-CONNECTION COMMUNICATION FUNCTION FOR TRANSMITTING AND RECEIVING DATA BLOCKS BY USING A PLURALITY OF CONNECTIONS, METHOD FOR CONTROLLING THE SAME, AND STORAGE MEDIUM

BACKGROUND OF THE INVENTION

Field of the Invention

The present invention relates to an information processing apparatus, a method for controlling the information processing apparatus, and a storage medium.

Description of the Related Art

With Hypertext Transfer Protocol (HTTP), an information processing apparatus establishes one connection with a server and performs data communication with the server. As a technique for performing this data communication more efficiently, in a known technique, a plurality of connections is established between the information processing apparatus and the server, and data blocks into which original data to be sent is divided are transmitted and received by using the plurality of connections. Hereinafter, transmission and reception of data blocks by using a plurality of connections is referred to as multi-connection communication.

Performing multi-connection communication enables using a plurality of connections in parallel and therefore achieves more efficient data communication than data communication by using one connection. Japanese Patent Application Laid-Open No. 2012-95098 discusses a technique in which an information processing apparatus notifies a server of the maximum number of connections, and the server communicates with the information processing apparatus according to the maximum number of connections indicated by the received notification.

When the information processing apparatus transmits data blocks to the server by using a plurality of connections, the information processing apparatus includes Content-Range information in the header of an HTTP packet and transmits data blocks to the server. When the server receives this HTTP packet, the server refers to the Content-Range information in the header to enable the combination of the plurality of received data blocks into one piece of original data by using the plurality of connections.

However, since specific header information such as the Content-Range information is not necessarily supported, multi-connection communication is not supported by some servers. Performing multi-connection communication on a server not supporting multi-connection communication will cause error termination, and the information processing apparatus will become unable to communicate with the server.

SUMMARY OF THE INVENTION

According to an aspect of the present invention, an information processing apparatus having a multi-connection communication function for transmitting and receiving data blocks by using a plurality of connections includes, a determination unit configured to determine whether an external apparatus as a communication partner supports the multi-connection communication function, and a communication unit configured to communicate with the external apparatus by using the multi-connection communication function in a case where the determination unit determines that the external apparatus supports the multi-connection communication function, and, to communicate with the external apparatus without using the multi-connection communication function in a case where the determination unit determines that the external apparatus does not support the multi-connection communication function.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings. The following exemplary embodiments are not intended to limit the present invention according to the appended claims. Not all of the combinations of the features described in the exemplary embodiments are indispensable to the solutions for the present invention.

Figure 1:
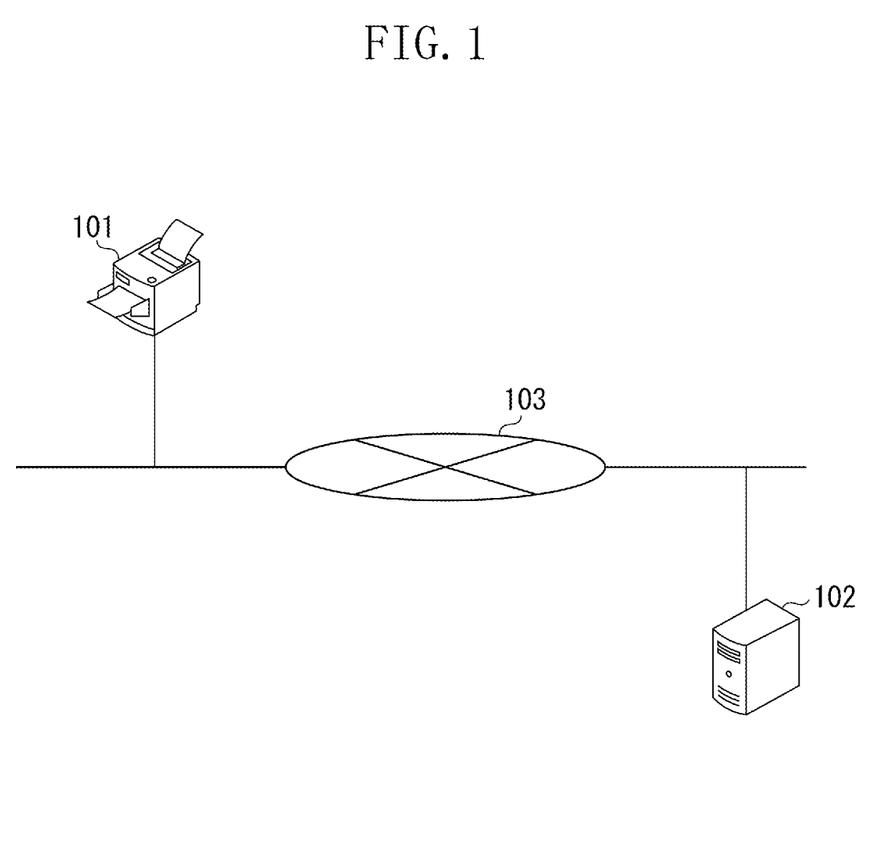
FIG. 1 illustrates an entire system.

A first exemplary embodiment of the present invention will be described below. A configuration of an information processing system according to the present exemplary embodiment will be described below with reference to FIG. 1. The information processing system according to the present exemplary embodiment includes an information processing apparatus 101 and a server 102. The information processing apparatus 101 and the server 102 are connected with each other via a network 103 so that they can communicate with each other.

Figure 2:
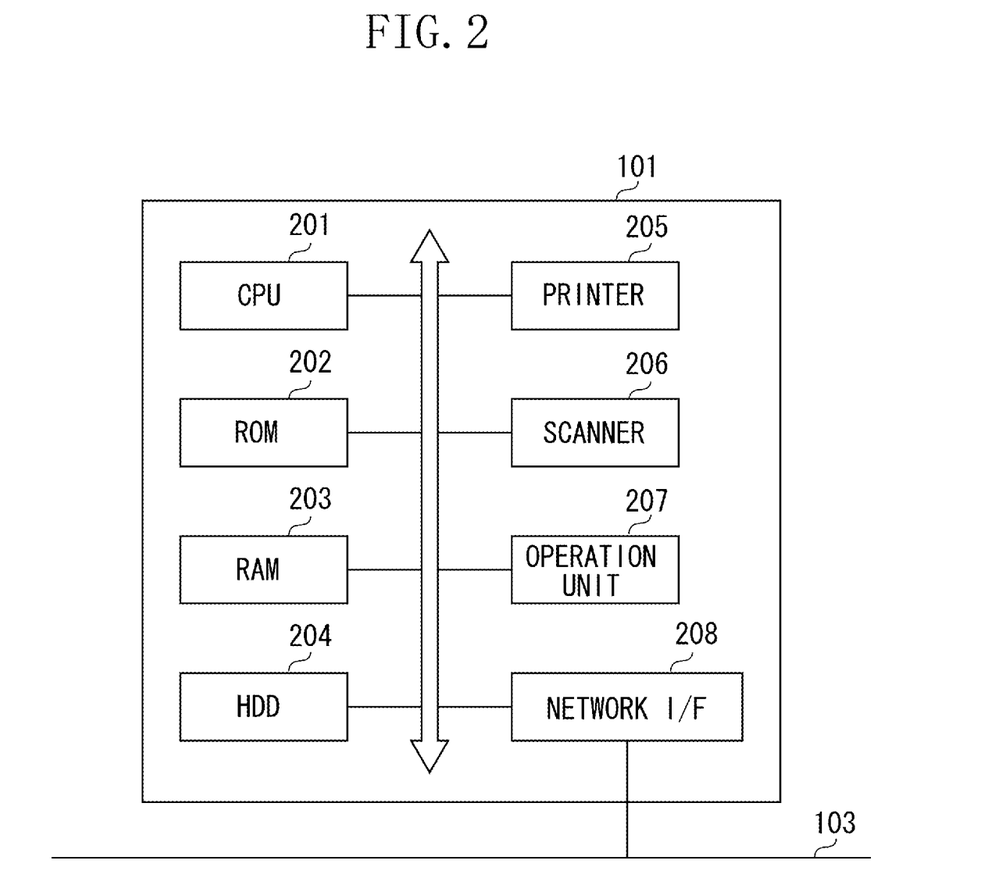
FIG. 2 is a block diagram illustrating a configuration of an information processing apparatus.

A hardware configuration of the information processing apparatus 101 will be described below with reference to FIG. 2. The information processing apparatus 101 is a printing apparatus provided with a copy function, a print function, a scanner function, and a transmission function. Although, in the present exemplary embodiment, a printing apparatus is described as an example of the information processing apparatus 101, the information processing apparatus 101 is not limited thereto, and may be any apparatus (e.g., a personal computer (PC), a mobile phone, a smart phone, etc.) capable of communicating with the server 102.

A central processing unit (CPU) 201 reads out a control program stored in a read only memory (ROM) 202 and controls operations of the entire information processing apparatus 101. A random access memory (RAM) 203 is used as a main memory for the CPU 201 and as a temporary storage area such as a work area. A hard disk drive (HDD) 204 stores various data such as font data, emulation programs, and form data.

Although, in the case of the information processing apparatus 101, one CPU 201 performs processing illustrated in flowcharts (described below), other configurations are also applicable. For example, the information processing apparatus 101 may be configured so that a plurality of CPUs performs processing illustrated in the flowcharts (described below) in a collaborative way.

A printer 205 performs print processing based on a print job and image data generated by a scanner 206. The scanner 206 reads a document and generates image data. An operation unit 207 is provided with, for example, a liquid crystal display (LCD) having a touch-panel function, and a keyboard. A user is able to input operations and instructions for the information processing apparatus 101 via the operation unit 207. A network interface (I/F) 208 communicates with an external apparatus such as the server 102 via the network 103.

When transmitting certain data to the server 102, the information processing apparatus 101 is able to establish a plurality of connections (Hypertext Transfer Protocol (HTTP) connections) with the server 102, and transmit the data by using the plurality of connections. In this case, the information processing apparatus 101 divides transmission target data into data blocks of a predetermined size, and transmits the data blocks in parallel to the server 102 by using the plurality of connections. The server 102 is able to combine the received data blocks into the original data. Furthermore, when acquiring certain data from the server 102, the information processing apparatus 101 is able to establish a plurality of connections with the server 102, and acquire the relevant data by using the plurality of connections.

Hereinafter, a communication method for transmitting and receiving data blocks by using a plurality of connections in such a way is referred to as multi-connection communication. The information processing apparatus 101 supports multi-connection communication, and is capable of performing multi-connection communication. Performing multi-connection communication enables using a plurality of connections in parallel, and therefore achieves more efficient communication than data communication using one connection. However, an external apparatus (e.g., the server 102) serving as a communication partner may not necessarily support multi-connection communication. The information processing apparatus 101 according to the present exemplary embodiment is characterized in that, when it is determined that the external apparatus does not support multi-connection communication, the information processing apparatus 101 switches the communication method to communication using one connection. Processing performed by the information processing apparatus 101 will be described in detail below with reference to flowcharts (described below).

Figure 3:
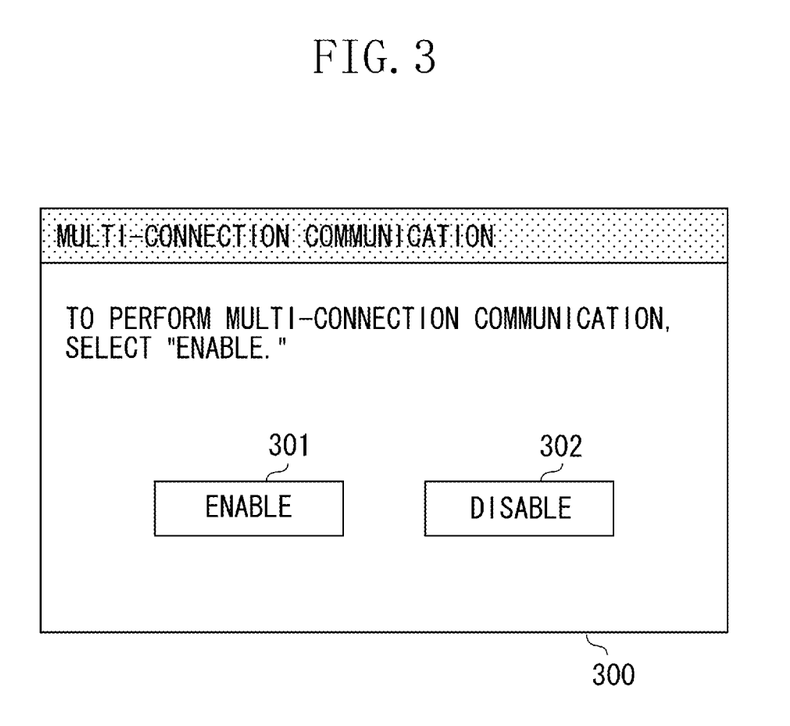
FIG. 3 illustrates a screen for setting whether multi-connection communication is enabled or disabled.

A screen 300 illustrated in FIG. 3 is a screen displayed on the operation unit 207. The screen 300 is used by the user to set whether the information processing apparatus 101 will perform multi-connection communication. When the user selects an "Enable" button 301, a setting "Perform Multi-Connection Communication" is stored in the HDD 204. On the other hand, when the user selects a "Disable" button 302, a setting "Do Not Perform Multi-Connection Communication" is stored in the HDD 204.

When the information processing apparatus 101 performs multi-connection communication, the processing load of the CPU 201 increases. Accordingly, if priority is to be given to the alleviation of the processing load of the CPU 201, the user needs to select the "Disable" button 302. On the other hand, if priority is to be given to the increase in communication speed, the user needs to select the "Enable" button 301.

As described above, the user can set whether to perform multi-connection communication via the screen 300. Although, in the present exemplary embodiment, any user can freely select a setting in the screen 300, the configuration is not limited thereto. Alternatively, for example, only a specific user (e.g., a user having administrator authority) may be allowed to access the setting function in the screen 300 by introducing a user authentication function into the information processing apparatus 101.

Figure 4:
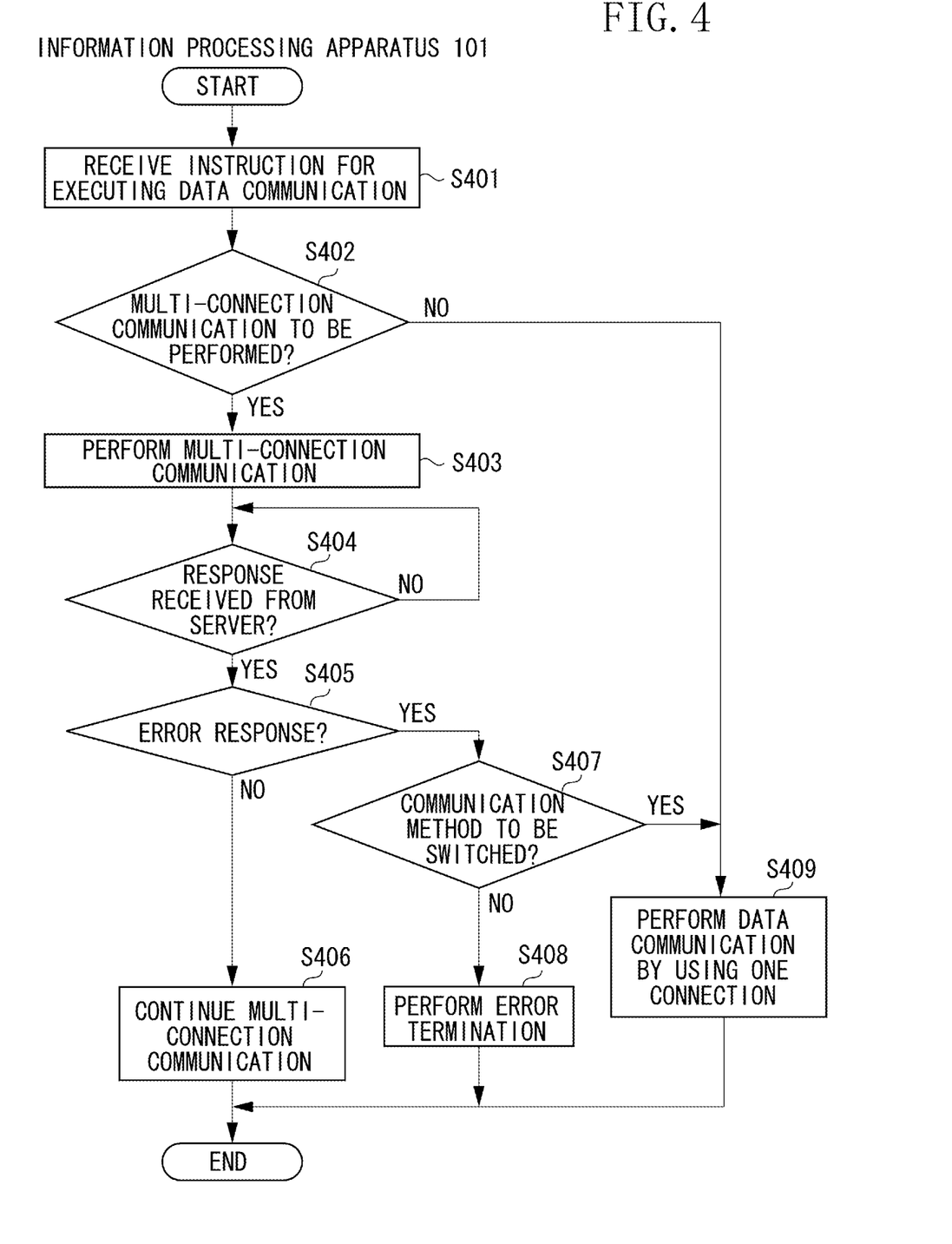
FIG. 4 is a flowchart illustrating processing according to a first exemplary embodiment.

Processing for multi-connection communication performed by the information processing apparatus 101 will be described below with reference to a flowchart illustrated in FIG. 4. Each step illustrated in the flowchart in FIG. 4 is implemented when the CPU 201 loads a program stored in a memory such as the ROM 202 into the RAM 203 and then executes the program. The user sets whether to perform multi-connection communication via the screen 300, and the selected setting is stored in the HDD 204.

Figure 5:
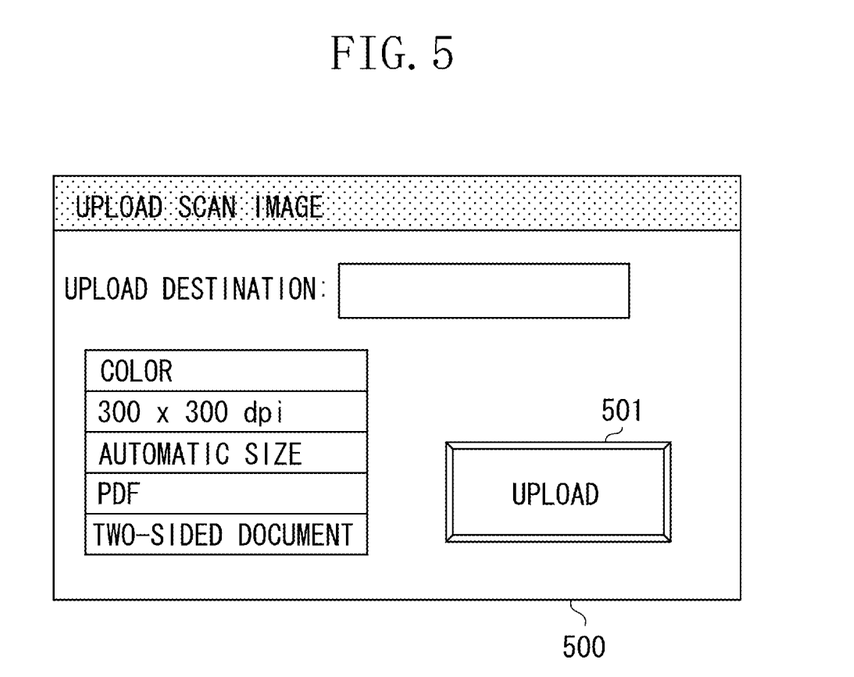
FIG. 5 illustrates a screen related to data transmission processing.

In step S401, the CPU 201 receives an instruction to perform data communication from the user. A screen 500 illustrated in FIG. 5 is used when the scanner 206 reads a document to generate a scan image (read image) and uploads the scan image to an external apparatus such as the server 102, and is displayed by the operation unit 207. For example, when the user presses an "Upload" button 501 in the screen 500, the CPU 201 receives an instruction to perform data communication in step S401.

When the CPU 201 receives the instruction to perform data communication in step S401, then in step S402, the CPU 201 determines whether to perform multi-connection communication. The CPU 201 makes the determination in step S402 by referring to the setting selected via the screen 300 and stored in the HDD 204. When the setting "Perform Multi-Connection Communication" is stored in the HDD 204, the CPU 201 determines to perform multi-connection communication (YES in step S402), and then, the processing proceeds to step S403. On the other hand, when the setting "Do Not Perform Multi-Connection Communication" is stored in the HDD 204, the CPU 201 determines not to perform multi-connection communication (NO in step S402), and then e, the processing proceeds to step S409.

Figure 6:
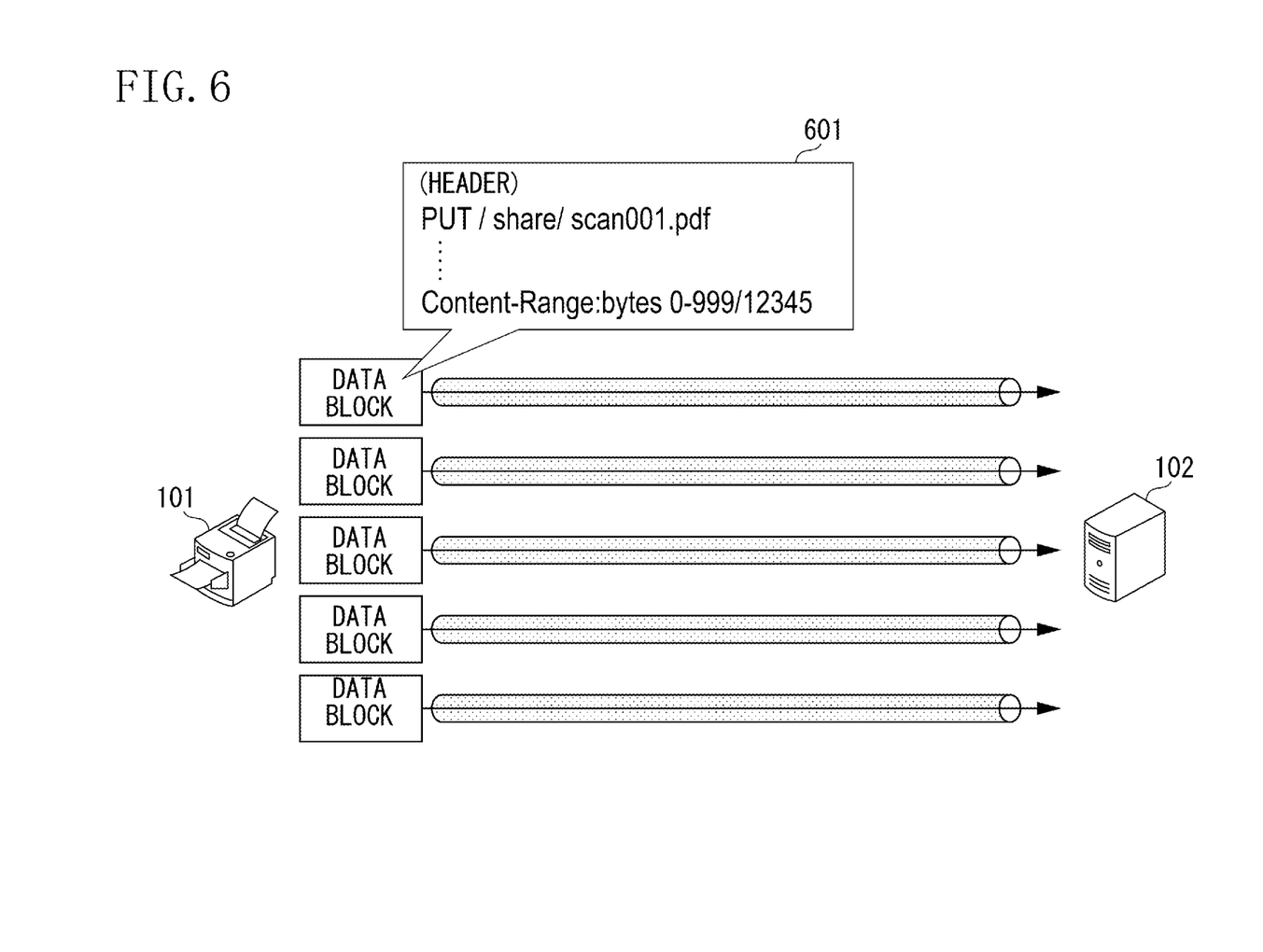
FIG. 6 illustrates multi-connection communication at the time of data transmission.

In step S403, the network I/F 208 establishes a plurality of HTTP connections with the server 102, and performs data communication by using the plurality of HTTP connections. Data communication performed in step S403 will be described in detail below with reference to FIG. 6.

The information processing apparatus 101 is assumed to establish 5 HTTP connections when multi-connection communication is performed. The number of HTTP connections (5) is merely an example. The number of HTTP connections is not limited thereto, and may be different according to the performance of an apparatus or may be set by the user. When the user presses the "Upload" button 501 illustrated in FIG. 5, the information processing apparatus 101 divides the scan image into data blocks of a predetermined size, and then transmits the data blocks to the server 102 by using the 5 HTTP connections, thus uploading the scan image to the server 102. A header 601 of a packet includes Content-Range information that indicates which bytes in the entire data a particular data block corresponds to. The header 601 indicates that the 0th to 999th bytes are to be transmitted as one data block. Upon reception of data blocks, the server 102 is able to combine the data blocks into the single piece of original data by referring to the Content-Range information. Although not illustrated in FIG. 6, the Content-Range information is specified in all of the data blocks to be transmitted in step S403.

In step S404, the CPU 201 determines whether a response packet is received from the server 102 in response to the communication performed in step S403. When the CPU 201 determines that a response packet has been received (YES in step S404), the processing proceeds to step S405. On the other hand, when the CPU 201 determines that a response packet has not been received (NO in step S404), the CPU 201 waits for reception of a response packet.

When the CPU 201 receives a response packet (YES in step S404), then in step S405, the CPU 201 determines whether the received response packet is a packet indicating an error response. When the server 102 supports the Content-Range information, a response packet indicating a successful reception is returned from the server 102. In the case of HTTP, a response packet indicating a successful reception refers to an HTTP packet that includes "200:OK" or "201: Created" in the status code. When the CPU 201 receives such a response packet indicating a successful reception from the server 102, the CPU 201 determines that the received response packet is not a packet indicating an error response (NO in step S405), and then, the processing proceeds to step S406.

In step S406, the network I/F 208 transmits the remaining data blocks to the server 102 by using the plurality of established HTTP connections. In other words, since the server 102 is known to support multi-connection communication, the information processing apparatus 101 continues multi-connection communication. In the communication performed in step S406, the header of each packet includes the Content-Range information similar to step S403.

On the other hand, when the CPU 201 determines that the received response packet is a packet indicating an error response (YES in step S405), then in step S407, the CPU 201 determines whether to switch the communication method.

When the server 102 does not support specific header information (e.g., Content-Range), the information processing apparatus 101 receives an error response from the server 102. When the received error response includes "400:Bad Request" or "501:Not Implemented" in the status code, it is highly likely that the information processing apparatus 101 is able to communicate with the server 102 if multi-connection communication is not used. In step S407, the CPU 201 determines whether to switch the communication method based on the type of received error response.

When a specific error response such as "400:Bad Request" or "501:Not Implemented" is received from the server 102, the CPU 201 determines to switch the communication method (YES in step S407), and then, the processing proceeds to step S409. On the other hand, when an error response such as the status code "500:Internal Server Error" is returned from the server 102, the information processing apparatus 101 is unable to communicate with the server 102 even if the communication method is switched. Accordingly, when a specific error response such as "500:Internal Server Error" is received from the server 102, the CPU 201 determines not to switch the communication method (NO in step S407), and then, the processing proceeds to step S408.

In step S408, the CPU 201 performs error termination. When the CPU 201 performs the error termination in step S408, the CPU 201 may either display an error termination message on the operation unit 207 or notify a predetermined external apparatus of the error termination.

The processing performed in step S409 will be described below. In step S409, the network I/F 208 performs data communication with the server 102 by using one HTTP connection. In this case, the network I/F 208 may use any one of the plurality of HTTP connections established in step S403, or may establish one new HTTP connection with the server 102. In the present exemplary embodiment, a scan image is transmitted to the server 102 in step S409 by using one HTTP connection. Since it is highly likely that the server 102 not supporting multi-connection communication has discarded the data blocks transmitted in step S403, in step S409, the scan image is transmitted from the top. The communication performed in step S409 does not include specific header information related to multi-connection communication, such as the Content-Range information.

The processing in step S409 is performed also when the CPU 201 determines not to perform multi-connection communication in step S402. When the CPU 201 determines not to perform multi-connection communication in step S402, the plurality of HTTP connections has not been established with the server 102. The network I/F 208 establishes one HTTP connection with the server 102 and then performs communication.

As described above, the information processing apparatus 101 is able to switch the communication method to communication using one HTTP connection when the server 102 has been determined not to support multi-connection communication. This enables performing data communication with the server 102 without performing error termination even if the server 102 does not support multi-connection communication.

Although, in the flowchart illustrated in FIG. 4, data transmission processing in which the information processing apparatus 101 transmits data to the server 102 is described as an example of multi-connection communication, the flowchart illustrated in FIG. 4 is not limited to the data transmission processing. The flowchart illustrated in FIG. 4 is also applicable to the data acquisition processing in which the information processing apparatus 101 acquires data from the server 102.

Processing for acquiring data from the server 102 performed by the information processing apparatus 101 will be described below with reference to FIGS. 4 and 7. For the flowchart illustrated in FIG. 4, steps for performing different processing from the above-described data transmission processing will be described in detail below, and descriptions of steps for performing similar processing to the above-described data transmission processing will be omitted. As an example of data acquisition processing, processing in which the information processing apparatus 101 acquires print data from the server 102 and then the printer 205 performs printing will be described below.

In step S403, the network I/F 208 establishes a plurality of HTTP connections with the server 102, and transmits to the server 102 GET requests defined in HTTP for acquiring print data by using the plurality of HTTP connections. FIG. 7 illustrates transmission of the GET requests. Range information is included in a header 701 of a packet transmitted to the server 102. Although descriptions are omitted in FIG. 7, the Range information is included in all of packets of the GET requests transmitted in step S403. The Range information specifies a range of print data to be acquired. In the case of the header 701, the server 102 is requested to send print data corresponding to the 0th to 999th bytes. Since the Range information is not necessarily supported, multi-connection communication using the Range information may not be supported by some servers, similar to the Content-Range information.

Figure 7:
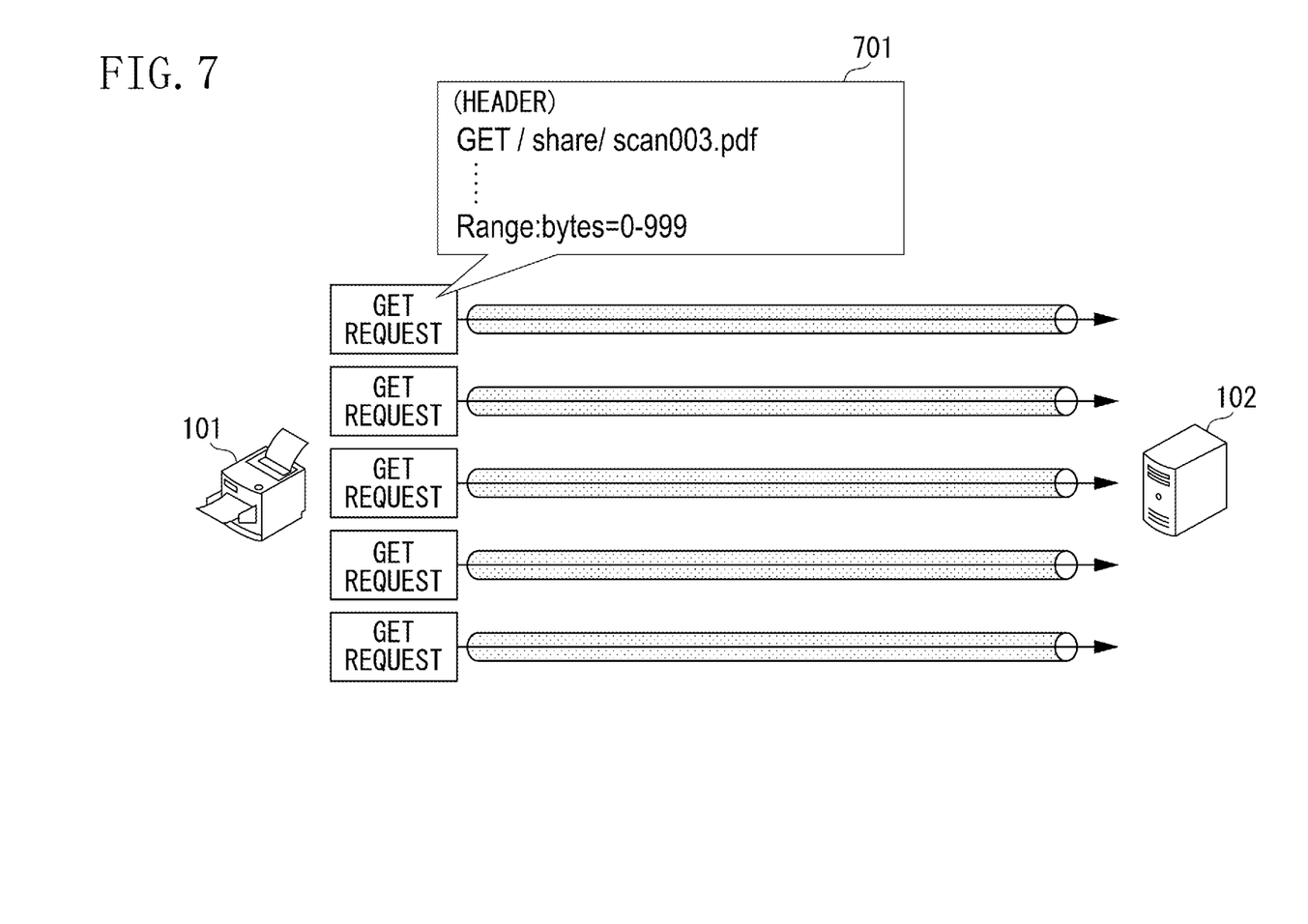
FIG. 7 illustrates multi-connection communication at the time of data acquisition.

When the server 102, which has received the GET requests illustrated in FIG. 7, supports the Range information (i.e., when the server 102 supports multi-connection communication), the server 102 transmits the print data in the range specified by the Range information to the information processing apparatus 101. Upon receiving this response, the information processing apparatus 101 determines that the received response is not an error response in step S405, and performs multi-connection communication also when acquiring the remaining print data in step S406. Upon completion of reception of the entire print data, the printer 205 performs print processing based on the received print data.

On the other hand, when the server 102, which has received the GET requests illustrated in FIG. 7, does not support the Range information (i.e., when the server 102 does not support multi-connection communication), the server 102 returns an error response to the information processing apparatus 101. In this case, the error response transmitted by the server 102 is an error response including "400:Bad Request" or "501:Not Implemented" in the status code, similar to the descriptions of the flowchart illustrated in FIG. 4. In step S407, the information processing apparatus 101 which has received such a response determines to switch the communication method, and then in step S409, the information processing apparatus 101 acquires print data from the server 102 by using one HTTP connection. In step S409, the Range information is not included in the GET requests to be transmitted to the server 102 by the information processing apparatus 101. Upon completion of reception of print data, the printer 205 performs print processing based on the received print data.

As described above, regardless of the data transmission processing or the data acquisition processing, the information processing apparatus 101 is able to switch the communication method for communicating with the server 102 that does not support multi-connection communication to communication using one HTTP connection.

A second exemplary embodiment of the present invention will be described below. In the configuration according to the first exemplary embodiment, the network I/F 208 is described to establish a plurality of HTTP connections and perform multi-connection communication in step S403, and then determine whether the server 102 supports multi-connection communication based on a response received from the server 102. In the configuration according to the present exemplary embodiment, as a modification of the first exemplary embodiment, the network I/F 208 first performs communication using one connection, and the CPU 201 determines whether the server 102 supports multi-connection communication based on a response received from the server 102.

Figure 8:
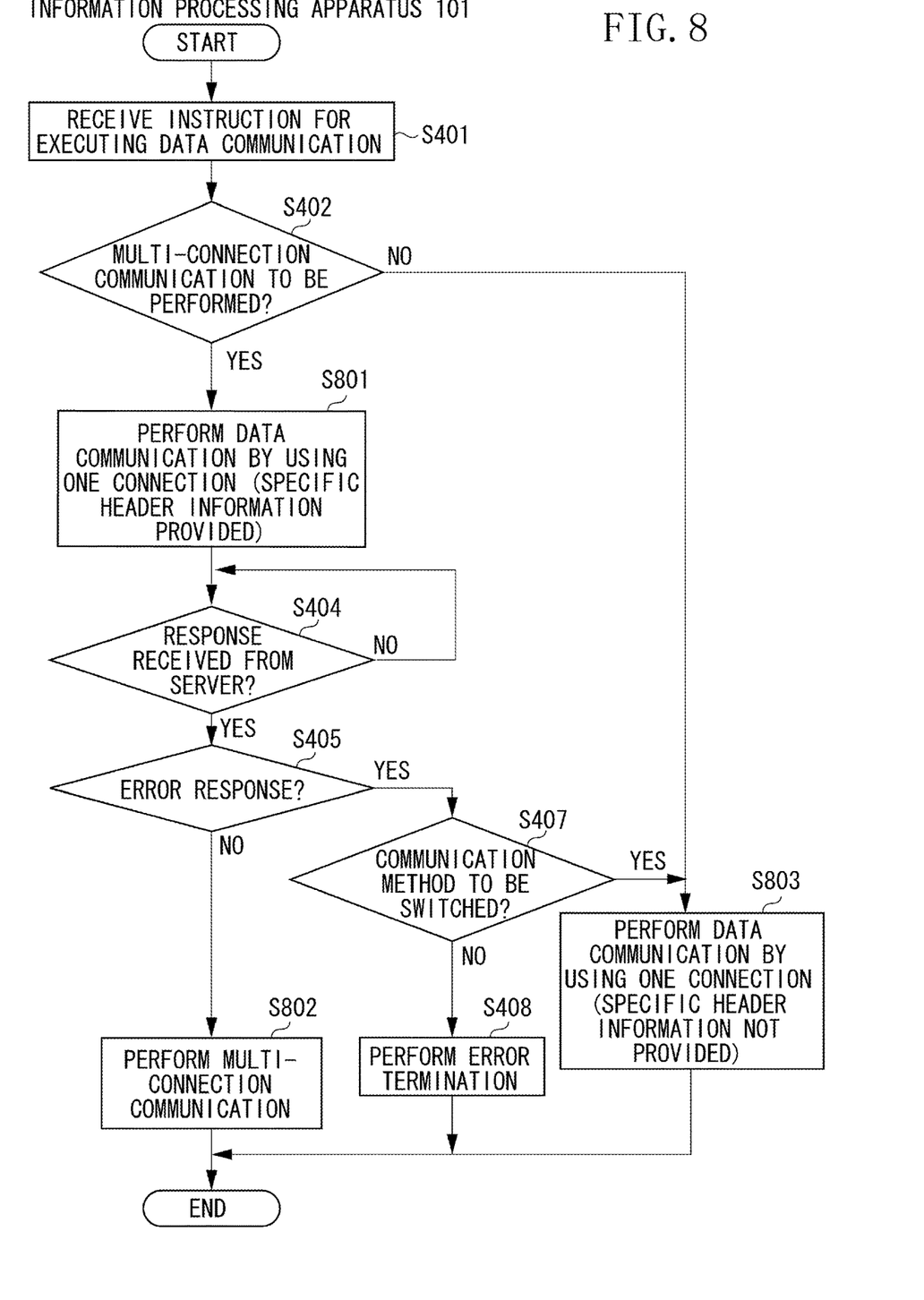
FIG. 8 is a flowchart illustrating processing according to a second exemplary embodiment.

Processing for performing multi-connection communication performed by the information processing apparatus 101 in the present exemplary embodiment will be described below with reference to a flowchart illustrated in FIG. 8. Each step illustrated in the flowchart in FIG. 8 is implemented when the CPU 201 loads a program stored in a memory such as the ROM 202 into the RAM 203 and then executes the program. Steps illustrated in FIG. 8 assigned the same step numbers as those illustrated in FIG. 4 perform similar processing, and therefore detailed descriptions thereof will be omitted.

In step S402, when the CPU 201 determines to perform multi-connection communication (YES in step S402), the processing proceeds to step S801. In step S801, the network I/F 208 establishes one HTTP connection with the server 102, and performs data communication with the server 102 by using the one HTTP connection. Data communication performed in step S801 will be described in detail below with reference to FIG. 9A.

Figure 9A:
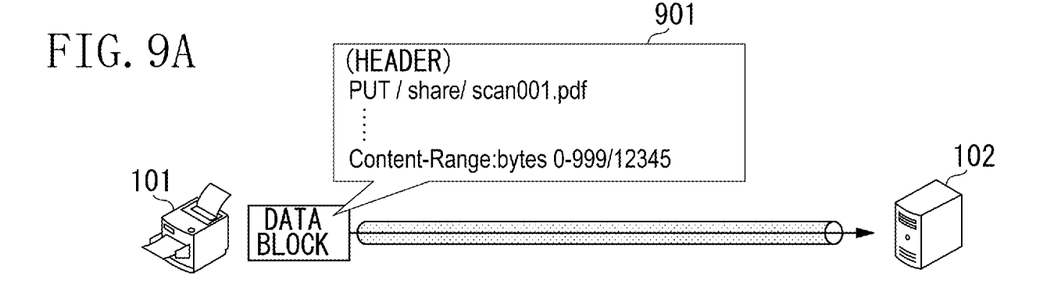
FIGS. 9A and 9B illustrate multi-connection communication according to the second exemplary embodiment.

Unlike step S403 illustrated in FIGS. 4 and 7, the information processing apparatus 101 establishes one HTTP connection with the server 102 instead of establishing a plurality of HTTP connections. FIG. 9A illustrates an example of processing for transmitting data (e.g., scan image) to the server 102 performed by the information processing apparatus 101. A header 901 of a data block to be transmitted by the information processing apparatus 101 includes specific header information (the Content-Range information in the case illustrated in FIG. 9A) related to multi-connection communication. Accordingly, based on a response received from the server 102, the information processing apparatus 101 is able to determine whether the server 102 supports multi-connection communication.

In step S801, when the information processing apparatus 101 transmits data including specific header information (the Content-Range information) to the server 102 by using one HTTP connection, the information processing apparatus 101 receives a response to the communication from the server 102. In step S405, the CPU 201 determines whether the received response packet indicates an error response.

Figure 9B:
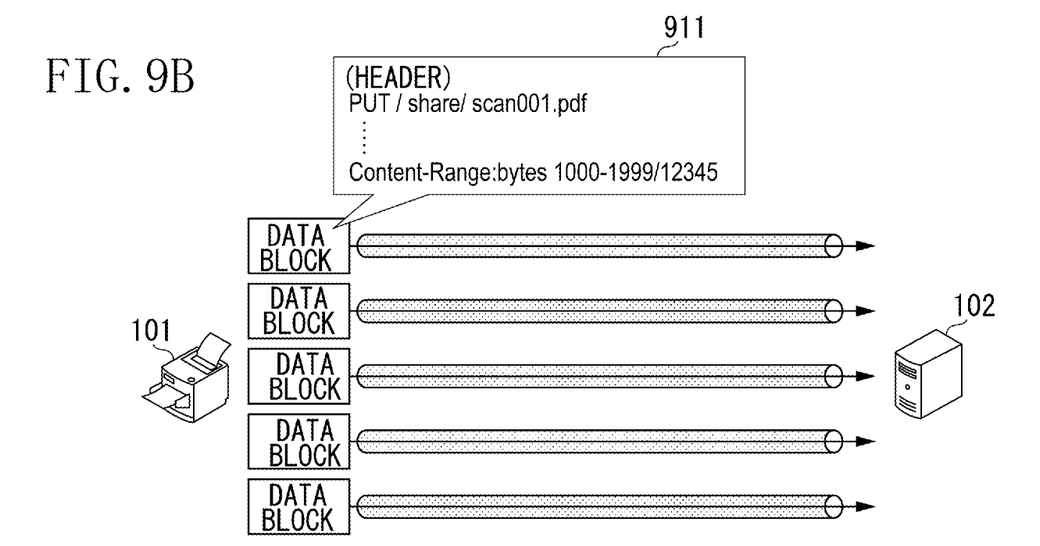

When the CPU 201 determines that the received response packet does not indicate an error response (NO in step S405), the processing proceeds to step S802. In step S802, the network I/F 208 performs multi-connection communication. In step S802, as illustrated in FIG. 9B, the information processing apparatus 101 establishes a plurality of HTTP connections with the server 102, and performs data communication by using the plurality of HTTP connections. A header 911 includes the Content-Range information.

On the other hand, when the received response packet indicates an error response (YES in step S405) and when the error is a specific error ("400:Bad Request" or "501:Not Implemented") (YES in step S407), the processing proceeds to step S803. In step S803, the network I/F 208 performs data communication with the server 102 by using one HTTP connection similar to step S409 illustrated in FIG. 4. Since the server 102 does not support multi-connection communication, the network I/F 208 performs data communication without using specific header information such as the Content-Range information, which is different from step S801.

When the present exemplary embodiment is compared with the first exemplary embodiment, the present exemplary embodiment differs from the first exemplary embodiment in that one HTTP connection is used instead of using a plurality of HTTP connections in step S801. Using one HTTP connection instead of using a plurality of HTTP connections in step S801 results in the following advantages.

Since communication using a plurality of HTTP connections increases the processing load on both the information processing apparatus 101 and the server 102, it is desirable to alleviate the processing load as much as possible. Therefore, performing communication using one HTTP connection until the CPU 201 determines whether the server 102 supports multi-connection communication enables alleviating the processing load on both the information processing apparatus 101 and the server 102.

A third exemplary embodiment of the present invention will be described below. Although, in step S407 illustrated in FIGS. 4 and 8, the CPU 201 selects whether to perform communication using one HTTP connection or the error termination based on the type of received error response, other configurations are also applicable. For example, when the CPU 201 determines that an error response has been received in step S405, the CPU 201 may uniformly switch the communication method from multi-connection communication to communication using one HTTP connection regardless of the type of error response.

A fourth exemplary embodiment of the present invention will be described below. Although, in the above-described exemplary embodiments, the CPU 201 determines whether the server 102 supports multi-connection communication each time the CPU 201 receives an instruction to perform data communication from the user, other forms are also applicable. For example, when first communication is performed with a server, the CPU 201 may determine whether the server 102 supports multi-connection communication, and store the result of the determination in a memory such as the HDD 204 in association with identification information which specifies the server 102. When performing second and subsequent communication with the server 102, the CPU 201 may determine whether to perform multi-connection communication, with reference to the information stored in a memory such as the HDD 204.

Figure 10:
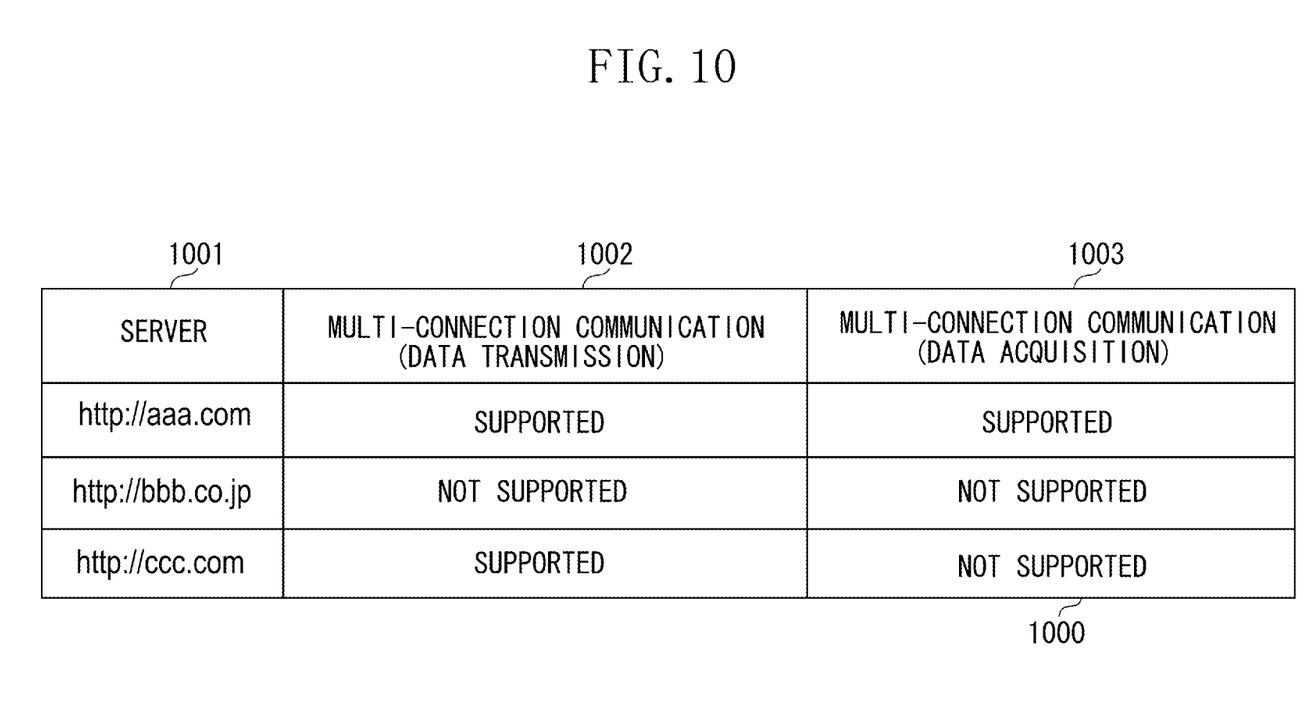
FIG. 10 illustrates a table stored in the information processing apparatus.

A table 1000 illustrated in FIG. 10 is used by the information processing apparatus 101 to store whether the server 102 with which the information processing apparatus 101 has once communicated supports multi-connection communication, and is stored in the HDD 204. When the CPU 201 receives a response from the server 102 in step S404 illustrated in FIG. 4 or 8 and the received response does not indicate an error, the information processing apparatus 101 stores, in the table 1000, information indicating that the server 102 as a communication partner supports multi-connection communication. On the other hand, when the received response indicates an error, the information processing apparatus 101 stores in the table 1000 information indicating that the server 102 as a communication partner does not support multi-connection communication.

An item 1001 stores the identification information specifying the server 102. Items 1002 and 1003 store information indicating whether the server 102 supports multi-connection communication for the data transmission processing and the data acquisition processing, respectively. The information is stored separately for the data transmission processing and the data acquisition processing because different header information is used in each piece of processing and the server 102 may support either one piece of processing.

For example, when the CPU 201 determines to perform multi-connection communication in step S402 illustrated in FIG. 4 or 8, the CPU 201 determines whether the server 102 serving as a communication partner supports multi-connection communication with reference to a table 1000. When information specifying the server 102 as a communication partner is stored in the table 1000, the CPU 201 needs to determine whether to perform multi-connection communication according to the stored determination result. When second and subsequent communication is performed with the server 102 that does not support multi-connection communication, the relevant information enables preventing execution of unnecessary communication (step S403 illustrated in FIG. 4 or step S801 illustrated in FIG. 8 for the server 102 not supporting multi-connection communication).

On the other hand, when the information identifying the server is not stored in the table 1000 (e.g., when first communication is performed), the CPU 201 needs to determine whether the server 102 supports multi-connection communication by performing processing in step S403 illustrated in FIG. 4 or step S801 illustrated in FIG. 8. Then, the CPU 201 needs to store the result of the determination in the table 1000 and refer to the stored information when performing subsequent communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-206739, filed Oct. 7, 2014, which is hereby incorporated by reference herein in its entirety.

What is claimed is:

1. An information processing apparatus having a multi-connection communication function for transmitting and receiving data blocks by using a plurality of connections, the information processing apparatus comprising:
a network interface;
at least one processor;
at least one memory storing instructions thereon which, when executed by the at least one processor, causes the information processing apparatus to:
set whether or not to enable the multi-connection communication function as an operation setting of the information processing apparatus;
accept a user operation for starting communication with an external apparatus corresponding to a destination specified by a user;
determine, in a case where the user operation is accepted in a state in which an operation setting of enabling the multi-connection communication function is set, whether the external apparatus as a communication partner supports the multi-connection communication function based on a response received from the external apparatus;

communicate with the external apparatus by using the multi-connection communication function via the network interface if it is determined that the external apparatus as the communication partner supports the multi-connection communication function;

communicate with the external apparatus by using one connection without using the multi-connection communication function via the network interface if it is determined that the external apparatus as the communication partner does not support the multi-connection communication function; and communicate with the external apparatus by using the one connection without confirming whether or not the external apparatus as the communication supports the multi-connection communication function in a case where the user operation is accepted in a state in which an operation setting of disabling the multi-connection communication function is set.

2. The information processing apparatus according to claim 1, wherein the memory further stores instructions to process which, when executed by the at least one processor, causes the information processing apparatus to transmit, via the network interface, in a case where the user operation is accepted in a state in which an operation setting of enabling the multi-connection communication function is set, a confirmation packet for confirming whether the external apparatus supports the multi-connection communication function to the external apparatus, and determine whether the external apparatus supports the multi-connection communication function based on a response packet to the confirmation packet.

3. The information processing apparatus according to claim 2, wherein the memory further stores instructions to process which, when executed by the at least one processor, causes the information processing apparatus to, in a case where the response packet is a packet indicating a specific error, determine that the external apparatus does not support the multi-connection communication function.

4. The information processing apparatus according to claim 1, wherein the information processing apparatus is a printing apparatus capable of performing print processing.

5. A control method for controlling an information processing apparatus having a multi-connection communication function for transmitting and receiving data blocks by using a plurality of connections, the control method comprising:

setting whether or not to enable the multi-connection communication function as an operation setting of the information processing apparatus;

accepting a user operation for starting communication with an external apparatus corresponding to a destination specified by a user;

receiving an instruction to perform communication from a user, and determining, in a case where the user operation is accepted in a state in which an operation setting of enabling the multi-connection communication function is set, based on the received instruction, whether the external apparatus as a communication partner supports the multi-connection communication function based on a response received from the external apparatus;

communicating with the external apparatus by using the multi-connection communication function if it is determined that the external apparatus as the communication partner supports the multi-connection communication function; and communicating with the external apparatus by using one connection without using the multi-connection communication function if it is determined that the external apparatus as the communication partner does not support the multi-connection communication function; and communicating with the external apparatus by using the one connection without confirming whether or not the external apparatus as the communication supports the multi-connection communication function in a case where the user operation is accepted in a state in which an operation setting of disabling the multi-connection communication function is set.

6. A non-transitory computer-readable storage medium storing a program for causing a computer to execute a control method for controlling an information processing apparatus having a multi-connection communication function for transmitting and receiving data blocks by using a plurality of connections, and the control method comprising:

setting whether or not to enable the multi-connection communication function as an operation setting of the information processing apparatus;

accepting a user operation for starting communication with an external apparatus corresponding to a destination specified by a user;

receiving an instruction to perform communication from a user, and determining, in a case where the user operation is accepted in a state in which an operation setting of enabling the multi-connection communication function is set, based on the received instruction, whether the external apparatus as a communication partner supports the multi-connection communication function based on a response received from the external apparatus;

communicating with the external apparatus by using the multi-connection communication function if it is determined that the external apparatus as the communication partner supports the multi-connection communication function; and communicating with the external apparatus by using one connection without using the multi-connection communication function if it is determined that the external apparatus as the communication partner does not support the multi-connection communication function; and communicating with the external apparatus by using the one connection without confirming whether or not the external apparatus as the communication supports the multi-connection communication function in a case where the user operation is accepted in a state in which an operation setting of disabling the multi-connection communication function is set.

7. The control method according to claim 5, further comprising:

receiving a confirmation packet for confirming whether the external apparatus supports the multi-connection communication function to the external apparatus; and determining whether the external apparatus supports the multi-connection communication function based on a response packet to the confirmation packet.

8. The control method according to claim 7,
wherein, in a case where the response packet is a packet indicating a specific error, determining that the external apparatus does not support the multi-connection communication function.

9. The control method according to claim 5,
wherein the information processing apparatus is a printing apparatus capable of performing print processing.

10. The storage medium control method according to claim 6, further comprising:
receiving a confirmation packet for confirming whether the external apparatus supports the multi-connection communication function to the external apparatus; and
determining whether the external apparatus supports the multi-connection communication function based on a response packet to the confirmation packet.

11. The storage medium according to claim 10,
wherein, in a case where the response packet is a packet indicating a specific error, determining that the external apparatus does not support the multi-connection communication function.

12. The control method according to claim 6,
wherein the information processing apparatus is a printing apparatus capable of performing print processing.

13. The information processing apparatus according to claim 1, further including an operation device,
wherein the user operation for starting communication is accepted via the operation device.

14. The control method according to claim 5, wherein the user operation for starting communication is accepted via an operation device of the information processing apparatus.

15. The storage medium according to claim 6, wherein the user operation for starting communication is accepted via an operation device of the information processing apparatus.

16. The information processing apparatus according to claim 1, further comprising a scanner device,
wherein the memory further stores instructions to process which, when executed by the at least one processor, causes the information processing apparatus to:
divide image data obtained by scanning a document using the scanner device into multiple transmission data; and
transmit the divided multiple transmission data to the external apparatus by using the multi-connection communication function via the network interface if it is determined that the external apparatus as the communication partner supports the multi-connection communication function.

17. The information processing apparatus according to claim 2,
wherein the memory further stores instructions to process which, when executed by the at least one processor, causes the information processing apparatus to store, into a table, correspondence information for correspondence between identification information of the external apparatus and information indicating whether or not the external apparatus supports the multi-connection communication function, based on a result of the determination, and
wherein, in a case where the user operation is accepted and, in addition, where the identification information of the external apparatus corresponding to the destination specified by the user is stored in the table, it is determined based on the correspondence information stored in the table without transmitting the confirmation packet to the external apparatus whether or not the external apparatus as the communication partner supports the multi-connection communication function.

* * * * *